US012574101B2

(12) United States Patent
Schmidt et al.

(10) Patent No.: US 12,574,101 B2
(45) Date of Patent: Mar. 10, 2026

(54) LOCATION DEPENDENT RELAY NODE CONFIGURATION

(71) Applicant: Wollochet Solutions LLC, Wilmington, DE (US)

(72) Inventors: Andreas Schmidt, Hochkirch (DE); Achim Luft, Braunschweig (DE); Maik Bienas, Schoppenstedt (DE); Martin Hans, Bad Salzdetfurth (DE)

(73) Assignee: Wollochet Solutions LLC, Wilmington, DE (US)

( * ) Notice: Subject to any disclaimer, the term of this patent is extended or adjusted under 35 U.S.C. 154(b) by 364 days.

(21) Appl. No.: 18/042,909

(22) PCT Filed: Aug. 27, 2021

(86) PCT No.: PCT/EP2021/073745

§ 371 (c)(1),
(2) Date: Feb. 24, 2023

(87) PCT Pub. No.: WO2022/043498

PCT Pub. Date: Mar. 3, 2022

(65) Prior Publication Data

US 2023/0336239 A1     Oct. 19, 2023

(30) Foreign Application Priority Data

Aug. 31, 2020    (EP) .................................... 20193585

(51) Int. Cl.
H04B 7/155 (2006.01)
H04L 41/0823 (2022.01)

(52) U.S. Cl.
CPC ..... H04B 7/15542 (2013.01); H04L 41/0823 (2013.01)

(58) Field of Classification Search
CPC ........................ H04B 7/15542; H04L 41/0823
See application file for complete search history.

(56) References Cited

U.S. PATENT DOCUMENTS 7,072,654 B2 * 7/2006 Fujiwara ............... H04W 60/00
455/433
8,867,383 B2 * 10/2014 Frenger .............. H04B 7/15542
370/254

(Continued)

FOREIGN PATENT DOCUMENTS

EP        2830344        1/2015
EP        2793512        10/2022

(Continued)

OTHER PUBLICATIONS

Irvine et al., "System Architecture for the Mostrain Project (Mobile Services for High Speed Trains)", Proc. IEEE 47th Veh. Technol. Conf., vol. 3, May 1997, pp. 1917-1921 (Year: 1997).*

(Continued)

*Primary Examiner* — Shah M Rahman
(74) *Attorney, Agent, or Firm* — Fish & Richardson P.C.

(57) ABSTRACT

The invention provides a method for configuring a mobile relay node in a communications system wherein the method comprises the mobile relay node requesting location dependent configuration data from an infrastructure node of the communications system; the mobile relay station receiving from the infrastructure node said location dependent configuration data; and configuring radio transmission characteristics of the mobile relay node in accordance with the received location dependent configuration data.

18 Claims, 6 Drawing Sheets

(56) References Cited

U.S. PATENT DOCUMENTS

| | | | | |
|---|---|---|---|---|
| 10,243,604 | B2 | 3/2019 | Ross et al. | |
| 10,359,497 | B1* | 7/2019 | Azem | G01S 3/38 |
| 10,856,106 | B1* | 12/2020 | Ganesan | G06F 16/9535 |
| 2012/0196528 | A1* | 8/2012 | Kazmi | H04W 52/46 |
| | | | | 455/9 |
| 2013/0260760 | A1* | 10/2013 | Pan | H04W 36/0009 |
| | | | | 455/436 |
| 2014/0226559 | A1 | 8/2014 | Jactat et al. | |
| 2014/0274064 | A1* | 9/2014 | Al-Shalash | H04W 24/08 |
| | | | | 455/437 |
| 2015/0043422 | A1* | 2/2015 | Fujishiro | H04W 36/008357 |
| | | | | 370/315 |
| 2015/0148062 | A1 | 5/2015 | Chen et al. | |
| 2015/0195757 | A1* | 7/2015 | Tietz | H04W 36/08 |
| | | | | 455/438 |
| 2017/0347338 | A1* | 11/2017 | Chen | H04W 72/30 |
| 2018/0019516 | A1 | 1/2018 | Teague | |
| 2021/0092604 | A1* | 3/2021 | Fox | H04L 9/0891 |
| 2021/0127430 | A1* | 4/2021 | Teyeb | H04L 67/141 |
| 2021/0250778 | A1* | 8/2021 | Tsutsui | H04B 7/0617 |
| 2021/0409956 | A1* | 12/2021 | Wagner | H04W 4/02 |
| 2022/0039080 | A1* | 2/2022 | Khoryaev | H04W 4/025 |
| 2022/0330196 | A1* | 10/2022 | Liu | H04W 8/24 |
| 2022/0386311 | A1* | 12/2022 | Furuichi | H04W 16/14 |
| 2023/0268991 | A1* | 8/2023 | Wakabayashi | H04W 76/15 |
| | | | | 370/327 |

FOREIGN PATENT DOCUMENTS

| | | |
|---|---|---|
| WO | WO 2014010493 | 1/2014 |
| WO | WO 2019036578 | 2/2019 |
| WO | WO 2020095597 | 5/2020 |

OTHER PUBLICATIONS

Faerber et al., "Beyond 2020 Heterogeneous Wireless Network with Millimeter-Wave Small-Cell Access and Backhauling," MiWaveS, Dec. 23, 2015, 138 pages.

* cited by examiner

*Backhaul Link*　　TRP$_B$　TRP$_A$　　*Access Link*

Base Station　　　　　Relay Node　　　　　UE

| Infrastructure Node of Higher Hierarchy | Database |
|---|---|

Database Query

Database Response

| Infrastructure Node of Higher Hierarchy | Database |
|---|---|

Database Update

Database Acknowledge

LOCATION DEPENDENT RELAY NODE CONFIGURATION

This invention relates to a provisioning of location and/or direction dependent configuration parameters to relay nodes for an optimal integration into wireless communication systems. In particular, the invention describes how a relay node (that may in one embodiment be present in form of a vehicular node) can inform an infrastructure node of higher hierarchy (such as a donor base station) about its location, and how the infrastructure side can reply to the relay node with location dependent configuration parameters for the relay node to apply at its current location and/or for a certain coverage area (i.e. into a certain direction).

A dense deployment of infrastructure nodes is vital to provide the high data rate and low latency demands for upcoming cellular communication systems, in which network infrastructure equipment (for example, base stations, relay nodes, IAB nodes, remote radio heads, and so on) may be mounted to vehicles and may thus be highly mobile. In this specification, a relay node is used as an example of such a type of mobile network infrastructure equipment and where used is not to be interpreted as meaning that the invention is limited to such a form of network infrastructure equipment.

Both nodes (relay node and its donor base station) communicate over a wireless link that may be formed according to one of 3GPP's air interface standards, such as 4G-LTE or 5G-NR technology. Likewise, the relay node itself may span at least one cell (or offer one or more radio beams) to serve a number of user equipment (UE) devices via access links operating according to one of 3GPP's air interface standards, such as 4G-LTE or 5G-NR technology.

Wireless connections implemented according to 4G-LTE are defined by the 36-series of 3GPP specifications, and wireless connections implemented according 5G-NR are defined by the 38-series of 3GPP specifications.

US 2014/0226559 A1 describes a mobile communication system in which a mobile relay node is mounted in a moving vehicle. In an attachment to the core network, a connection setup is requested which is responded to by a donor base station providing basic connection setup information such as an identifier. A further RRC connection reconfiguration is then performed with the relay node receiving a static cell ID and a static tracking area identifier.

US 2018/0019516 A1 describes the connection of an unmanned aerial vehicle (UAV) to a ground station. The ground station orients an antenna to the UAV by obtaining a position of the UAV while the ground station may provide position information to the UAV so that the UAV can steer its antenna towards the ground station.

EP 2 830 344 A1 describes the operation of a mobile relay node (MRN). The MRN may provide an OAM server with a list of the MRN's neighbouring eNBs. The MRN may also communicate its load state to the serving eNB.

U.S. Pat. No. 10,243,604 B2 describes an autonomous vehicle (AV) mesh system in which an AV tracking and updating system tracks AVs in a given region. If the system determines that an AV will enter a network-limited region, the system transmits a set of configuration commands to proximate AVs to establish a mesh network. WO 2019/036578 A1 describes a mechanism for selecting resources for sidelink communication based on geo-location information. EP 2 793 512 A1 concerns techniques for configuring a dedicated tracking area for a mobile relay node. WO 2014/010493 A2 relates to the handover of a mobile relay node from one base station to another in, for example a railway-based system, which may involve route information, position information of base stations and the use of positioning information of the MRN. US 2015/0148062 describes MRN tracking area configuration and location updating.

FIG. 1 shows a generic cellular communication system operated by a mobile network operator (MNO) according to 3GPP. Details of the functional entities shown in FIG. 1 are for instance described in 3GPP TS 36.300 (for 4G-LTE) and 3GPP TS 38.300 (for 5G-NR).

For example, in case of 5G-NR, the radio access network (RAN) consists of base stations called gNBs, providing the user plane (SDAP/PDCP/RLC/MAC/PHY) and control plane (RRC) protocol terminations towards the mobile communication devices (UEs). The gNBs are connected by means of the NG interface ("IF1" in FIG. 1) to the core network (CN), more specifically to the access and mobility management function (AMF, taking care of control plane or C-Plane traffic) by means of the NG-C interface and to the user plane function (UPF, taking care of user plane or U-Plane traffic) by means of the NG-U interface. The NG interface supports a many-to-many relation between AMFs/UPFs and gNBs.

The gNBs are also interconnected with each other by means of the Xn interface ("IF2" in FIG. 1). The Xn interface is connecting the various base stations logically with each other. In some deployments, an Xn connection may physically be routed through the CN.

Each base station of the cellular communication system may control communication over the air interface within its geographic coverage area, namely in its radio cell(s). When the mobile communication device (UE) is located in coverage of a radio cell and camping on it (in other words, when it is registered with the radio cell providing coverage) it may communicate with the base station controlling that radio cell. When a call is initiated by the user of the mobile communication device (mobile originated traffic) or a call is addressed to the mobile communication device (mobile terminated traffic), radio channels may be set up between the mobile communication device and the base station controlling the radio cell in which the mobile communication device is located. The air interface between a UE and its serving base station is also referred to as access link. The entirety of all access links provided by a base station defines the base station's service area.

As the mobile communication device moves through the coverage area of the cellular communication system, control of the call may be transferred between neighbouring radio cells. The transfer of calls from one radio cell to another radio cell is usually referred to as handover (or handoff). Handover is usually based on measurements (e.g., measurements of the downlink signal strength on the serving cell and/or at least one different overlapping and/or neighbouring radio cell) performed by the UE as configured by the network.

In this context, the term "call" is intended to cover a wide variety of use cases where user data is being exchanged unidirectionally or bidirectionally over the air interface (access link) as part of an active connection (i.e. when the UE is in RRC_CONNECTED state of operation) between a serving base station and a mobile communication device. It can for example be a voice call, a data call, internet data traffic, and much more.

An IF1 connection (with or without a piggy-backed IF2 connection) is often realized as a wired connection (e.g., using fibre optics between the core network and the base station site). Said wired connections are quite expensive for the MNO and inflexible. However, depending on the scenario, deployments exist where such IF1 and/or IF2 connections are realized as wireless, highly directive line-of-sight connections (e.g., between two base station towers where line-of-sight is prevalent) using an antenna system (e.g., a dish antenna) that is distinct from the antennas serving the UEs.

Operation and maintenance (O&M) protocols are the essence of the network management to establish connectivity with the various network elements to be managed. Without a well-functioning O&M protocol, the network management system (MNS) will not get a network element condition (e.g., by means of status requests) and will not be able to provision configuration changes to the network elements (e.g., by means of reconfiguration commands).

O&M protocols provide services to exchange operation and maintenance data between the NMS and the network elements. They are usually optimized for security, reliability and robustness. Various O&M protocols exist and each of them has different benefits and drawbacks with respect to one aspect or another. What they all have in common is independence from underlying physical layer or data link layer protocols. At the same time O&A protocols can be designed to support a range of different higher-layer applications. The O&M application layer has logic of the specific O&M area, for example, fault management, connection management and, so on. In this invention the O&M area of relevance is relay node management.

3GPP LTE Rel-10 introduces the concept of relay nodes (as part of "LTE-Advanced"). A relay node as defined by 3GPP in this context is a low power base station that may provide enhanced coverage and capacity at cell edges or in hot-spot areas. The relay node is served by a donor eNB (DeNB) via a radio interface, LTE Un, which is a modification of the LTE Uu air interface. Hence, in the donor cell the radio resources are shared between UEs served directly by the DeNB and those that serve the relay node. This kind of relay node has to be positioned within the DeNB's coverage area as a relay node residing outside the DeNB's coverage could not connect to the DeNB and thus would not have a backhaul link. Rel-10 relay nodes were defined to bring stationary coverage extensions to the network.

FIG. 2 shows how an LTE Rel-10 relay node is integrated into the RAN structure of a 3GPP communication system operating according to 4G-LTE.

Type 1 LTE relay nodes control their cells with their own cell identity (physical cell ID as defined in LTE Rel-8) including the transmission of their own synchronisation channels and reference symbols. The UE shall receive scheduling information and HARQ feedback directly from the relay node and send its control channels (SR/CQI/ACK) to the relay node. Type 1 relays appear as if they are an eNB to UEs. This ensures backwards compatibility. However, when the relay node is of Type 1, there is a high risk for interference in the relay node, when receiving on Uu and transmitting on Un (or vice-versa) takes place at the same time. This can be avoided through time division between Uu and Un (cf. "negotiation of special subframes" further below), or by having different locations of the transmitter and receiver. There are two further sub-types within this category:

Type 1.a: These LTE relay nodes are outband RNs (i.e. Uu and Un use different frequencies) which have the same properties as the basic Type 1 relay nodes, but they can transmit and receive at the same time, i.e. full duplex.

Type 1.b: This form of LTE relay node is an inband form. They have a sufficient isolation between the antennas used for the BS-RN and the RN-UE links. This isolation can be achieved by antenna spacing and directivity as well as specialised digital signal processing techniques, although there are cost impacts of doing this. The performance of these RNs is anticipated to be similar to that of femtocells.

Type 2 LTE relay nodes do not have their own cell identity and look just like the main cell. Any UE in range is not able to distinguish a relay from the main eNB within the cell. Control information can be transmitted from the eNB and user data from the LTE relay.

The RN start-up procedure is a two-step process which is based on the normal UE attachment procedure. In the first step (cf. FIG. 3), the RN connects as a normal UE to an eNB in order to get all the information it needs to connect as a relay in the second step. This may be done to any eNB, regardless of whether it has DeNB capabilities or not. The main purpose is to connect to the O&M server (=network management system) in order to obtain the list of initial parameters, which comprises most importantly the list of DeNBs. Then the RN detaches and triggers the next step, the attachment for RN operation. In this second attachment (cf. FIG. 4), the UE selects one of the DeNBs provided by the O&M. Authentication and security is repeated because now the RN attaches for relay operation. Potential demand and structure for the special subframes are negotiated and finally the NMS can complete the RN configuration. After the setup of IF1/IF2 connections, the RN can start operating. A 3GPP Rel-10 RN supports to a large extent the same functionalities as the eNB. However, the DeNB will be responsible for CN node (MME) selection.

In the second step, the special subframe configuration (comprising time duplex information for interference mitigation) can be indicated to the RN at different occasions. FIG. 4 shows two example occasions, namely the RRC_Connection Set-Up_Complete message and the RRC_Connection_Reconfiguration message. Both messages can be transmitted from the DeNB (=base station of higher hierarchy) to the RN at the RRC layer of the protocol stack. The RN applies the special subframe configuration immediately upon reception.

It is to be noted that the first release of 5G-NR does not yet include any relay functionality as defined in 3GPP Rel-10 for 4G-LTE. However, it can be expected that in future versions of 5G-NR (i.e. beyond Rel-15) relay mechanisms similar to the 4G-LTE concept are developed. For example, as part of 3GPP's activities on Rel-16, work on integrated access and backhaul (IAB) started for 5G-NR. It is based on the findings of the corresponding study phase (3GPP TR 38.874). IAB aims at enabling flexible and very dense deployment of 5G-NR cells without the need to densify the transport network proportionately. The underlying idea of IAB is to better exploit the spatial reuse properties that directed radio beams can offer for access and backhaul links. Currently, all IAB work is restricted to physically fixed (i.e. stationary) relays nodes. An IAB node is a new type of network node not requiring any wired backhaul. It consists of a distributed unit (DU) base station component making it possible to appear as a regular cell to the UEs it serves, and a mobile terminal (MT) base station component inheriting many properties of a regular UE which connects to its donor parent node(s). While the first version of IAB in 5G-NR Rel-16 assumes half duplex operation between access and backhaul for transmission and reception, support of full duplex operation will likely be the next evolutionary step in Rel-17 (thereby keeping the scope restricted to stationary relays nodes).

In cellular communication systems operating according 5G-NR the frequency range for the access link may comprise frequency bands below 6 GHz as well as above 6 GHz. The latter requires beamforming of radio signals to extend the otherwise limited coverage area. It is envisaged that RAN nodes deployed for 5G-NR are therefore equipped with antenna systems that allow concentration of radio signals towards a certain spot or into a certain direction. These antenna systems are known as "phased arrays". Usually, concentrated radio transmissions come along with a reduction of the respective radio beam's width. A directed antenna beam usually consists of a strong main lobe pointing into the desired direction of signal reinforcement and at least one side lobe with much less intensity. In some deployments, beam forming techniques can also be utilized in cellular communication systems operating in "legacy" frequency bands below 6 GHz.

In this context, a RAN node may be a base station, a relay node, an IAB node, a Remote Radio Head (RRH), or any combination thereof. In case a functional network node split into central unit (CU) and distributed unit (DU) is defined, as currently discussed in 3GPP for upcoming releases of 5G-NR, a RAN node may also be represented by a sub set of a base station, such as a CU or a DU. Antenna arrays (e.g., "phased arrays") that enable beam forming (or their mounting positions) are also referred to as transmission and reception points (TRPs) in this specification.

In an RRC_CONNECTED state an RRC connection has been established for the transfer of data to/from the UE and mobility of a UE is network controlled and UE assisted. That means based on measurements collected by and received from the UE the infrastructure side may trigger handover from one base station to another.

In an RRC_IDLE state mobility is solely under control of the UE. That means based on measurements collected by the UE, the UE itself continuously checks whether there are radio cells around that are better suited for the UE to camp on (although certain limitations can be configured by the infrastructure side). A UE in RRC_IDLE is required to inform the infrastructure from time to time about changes of its tracking area (in order to guarantee reachability in case of paging).

Details about the UE states in 4G-LTE and state transitions (including inter-RAT aspects) can be found in section 4.2 of 3GPP TS 36.331. Details about the UE states in 5G-NR and state transitions (including inter-RAT aspects) can be found in section 4.2 of 3GPP TS 38.331.

A UE residing in an RRC_CONNECTED state of operation is configured with RRM measurements and reporting criteria to ensure that the serving base station is always informed about the current link quality to itself and alternative base stations. RRM involves strategies and algorithms for controlling (primarily physical layer) parameters such as transmit power, handover criteria, modulation and coding scheme, error coding, etc. The objective is to utilize the limited radio-frequency spectrum resources and radio network infrastructure as efficiently as possible. Measurement reporting may be a continuous process or event triggered.

As far as fixed base stations and relay nodes are concerned the MNO usually has detailed knowledge about the location characteristics of these entities in its network: It knows the exact geolocations of the entities and their antenna systems forming the RAN. This includes, for example, knowledge about the mounting height and orientation of the deployed antenna systems (e.g., direction and/or tilt for beam dissemination and reception).

For upcoming mobile relay nodes, that may be realized in form of vehicle-mounted base stations, this is no longer the case, making adjustment and optimization of network coverage more challenging. For directed (i.e. beamformed) transmission and reception of radio signals even more so. After all, the mobile relay nodes' positions and directions (and inherently the orientation of the antenna systems they are carrying) are not under control of the MNO.

For the integration of mobile relay nodes into an existing network infrastructure the MNO is required to know certain location related pieces of information for the network optimization and coverage adjustment methods we discuss in this invention. It may then choose to configure mobile relay nodes with a set of location and/or direction dependent configuration parameters for optimal integration into the RAN.

The present invention provides a method for configuring a mobile relay node in a communications system wherein the method comprises the mobile relay node sending a request message to an infrastructure node of the communications system requesting from the infrastructure node configuration data which are dependent on a location of the mobile relay node, the location dependent configuration data providing information to the mobile relay node for controlling a communication of the mobile relay node with one or more user equipment devices, wherein the request message comprises information relating to the location of the mobile relay node; the mobile relay station receiving from the infrastructure node said location dependent configuration data; and configuring radio transmission characteristics of the mobile relay node in accordance with the received location dependent configuration data.

In a further aspect, the invention provides a method of operating a mobile communication system infrastructure node, the method comprising receiving at an infrastructure node of the communications system a request message from a mobile relay node requesting configuration data which are dependent on a location of the mobile relay node, the location dependent configuration data providing information to the mobile relay node for controlling a communication of the mobile relay node with one or more user equipment devices, wherein the request message comprises information relating to the location of the mobile relay node; using the received information relating to the location of the mobile relay node to generate the requested location dependent configuration data for use by the mobile relay node for configuring radio transmission characteristics for transmitting signals to one or more user equipment devices; and transmitting the location dependent configuration data to the mobile relay node.

In one aspect the invention provides a method to provision a mobile relay node (e.g., a vehicle-mounted base station) with location dependent operation parameters. Said parameters are particularly useful in a 5G-NR environment with antenna systems that allow concentration of radio signals towards a certain spot or into a certain direction (also known as beam forming operation). The focus of the present invention lies on parameters used to configure one or more directional access links between a relay node and a (group of) UE(s).

Differing aspects of the method may include the following.

According to a first aspect of the present invention, the relay node (e.g., a vehicular mounted base station) requests location dependent configuration data from another infrastructure node of higher hierarchy (such as a donor base station or a core network entity) via a wireless link. The relay node may inform the other infrastructure node of higher hierarchy about its current location and (if applicable) the projected duration of its stay there. If the relay node is mounted on a vehicle, it may additionally send detailed positioning information to the infrastructure node about the vehicle's current heading/bearing/antenna array orientation and so on. If available, the relay node may also include information about detected UE population at a given spot or in a certain direction in its transmission to the donor base station. An infrastructure node may forward the relay node's configuration request to another infrastructure node (again, of higher hierarchy) being located either in the radio access network or in the core network, so that a check may be performed there.

According to a second aspect of the present invention, the receiving infrastructure node evaluates the information received from the relay node (wherein "evaluating" may comprise at least one of processing, deciding, and composing as described below).

According to a third aspect of the present invention, the check may involve a database query (input: location details of the relay node, estimations regarding UE population in its vicinity, and so on/output: area to be served (angle, distance, beam width), maximum transmit power, bandwidth parts configuration, measurement gap configuration, a decision whether to use omni-directional or beam-formed signal transmission/reception, and so on). Optionally, other pieces of information can be figured in, such as knowledge about the area, street map, landscape, topology and/or the vehicle's or relay node's past and projected itineraries and/or historic information about successful/unsuccessful relay node configuration gathered from other relay nodes that were present at the same location under similar circumstances.

According to a fourth aspect of the present invention, a reply containing location and/or direction dependent configuration details is sent back to the relay node via the wireless link. The reply may be based, for example, on what the infrastructure node (e.g., donor base station) has received from the other infrastructure node (of higher hierarchy) or from the network management system (MNS) or from an operation and maintenance (O&A) server.

According to a fifth aspect of the present invention, the location specific configuration parameters are applied upon reception of the configuration information by the relay node. In detail, the relay node's service area (e.g. defined by angle, distance, beam width, beam tilt, and alike) is configured and other settings, for example pertaining to the relay node's maximum transmit power, or bandwidth parts configuration, measurement gap configuration, and so on are applied.

According to a sixth aspect of the present invention, the database providing assistance information to help in the decision-making process for relay node configuration, can be filled (or updated) with meaningful data that may be needed in future relay node configuration procedures.

According to a seventh aspect of the present invention, events are discussed for initiating the relay node configuration procedures (such as, a poll from the infrastructure side or trigger event defined for the vehicle and alike).

In an embodiment of the present invention and in relation to beam forming the configuration parameters are not only location dependent, but also direction dependent. Likewise, the configuration parameters may not only be location specific, but also direction specific.

The invention offers means to configure mobile relay nodes, in particular vehicle-mounted relay nodes, in a flexible manner by providing location dependent configurations parameters (e.g., for operating the relay node's antenna systems, forming radio beams, directing access links to places of UE population, and so on). With our method, the operation of mobile relay nodes can be tailored to the demands at any given location: Coverage holes in the fixed cell deployment can be optimally filled and traffic hot spots can be optimally served. At the same time the method allows mitigation of interference caused by the mobile relay node on the remaining (predominantly fixed) part of the MNO's radio cell deployment.

Very flexible and spontaneous deployment of 5G-NR radio cells (including directed, i.e. beamformed, transmission and reception of radio signals beams) is enabled without the need for densifying the underlying wired transport network (e.g., with fibre optics).

Due to the expected TRP capability to support simultaneous generation of multiple beams pointing into different directions, the method provides means to fill more than one coverage hole and to serve more than one traffic hot spot, respectively.

The method accordingly extends the reach of relay nodes significantly, improves the coverage of the operator network and lowers deployment costs.

Preferred embodiments of the invention will now be described, by way of example only, with reference to the accompanying drawings in which.

Figures 5, 8, 9:
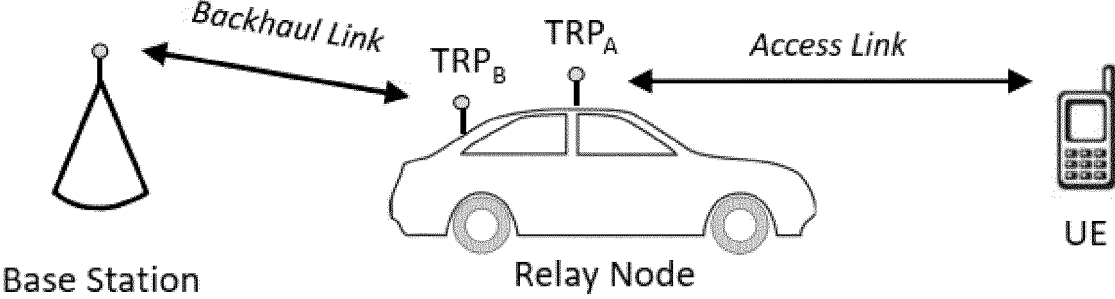
FIG. 5 illustrates an exemplary form of mobile relay node.
FIG. 8 is a message flow chart illustrating the use of a database.
FIG. 9 is a message flow chart showing an updating of the database.

In the following embodiments of the present invention mobile relay nodes are described, i.e. relay nodes that are for instance mounted on a vehicle, such as a car as shown in FIG. 5. The car may be equipped with two separate TRPs, one for a backhaul link or links (wireless connection to the MNO's fixed network infrastructure via TRPB) and one for an access link or links (wireless connection to serve a number of UE devices via $TRP_A$), or a combined TRP offering capabilities to operate backhaul and access link concurrently or in an alternating manner. At least one of the TRPs may be capable of directional radio signal transmission (Tx Beam) and reception (Rx Beam) as described above. This is known as beam forming.

In the context of the present invention the term vehicle is not meant to be a restriction to a certain type of vehicle. Instead, the term does include any type of movable object, including vehicles on the ground (e.g., motorbikes, cars, trucks, bicycles, and so on), in the air (e.g., drones, unmanned aerial vehicles, planes, helicopters, high altitude communication platforms, balloons, satellites, and so on), or on water (e.g., boats, ships, vessels, ferries, and so on).

Furthermore, there doesn't have to be a human driver on board steering or navigating the vehicle. Remotely controlled vehicles as well as autonomously driven vehicles are explicitly included into the scope of the present invention.

For example, when the car is parked at the side of the street, it may inform an infrastructure node of higher hierarchy (such as its donor base station) via the wireless link provided by TRPB about its current parking position (geolocation) and the projected duration of its stay there. The former may for example be retrieved from a global navigation satellite system (GNSS) module in form of GNSS coordinates. The latter may for example be derived from an electronic parking meter function (e.g., deployed in the vehicle) or (if applicable) from messages that were exchanged in the course of the parking time negotiation process between the car and some parking space management server on the internet or a similar function deployed in a road side unit, such as a (multispace) parking meter.

In one embodiment a mobile relay node may be powered by solar panels and/or by the battery of the vehicle it is attached to. In this case, the relay node may become unsuited after a while for executing the anticipated network optimization and coverage adjustment method when it is forced to enter a status of inactivity, e.g. at night-time or when the battery runs out. In order to help decision making with respect to the location specific configuration procedure, it may therefore be beneficial to report information about the power supply and/or remaining battery power to the infrastructure node of higher hierarchy (such as its donor base station) as well.

Additionally, the car may transmit to the infrastructure node details about the vehicle's current orientation and/or TRP$_A$'s current orientation. The mobile relay node may also have checked the presence/absence/density of UE population within its reach in at least one direction, for example by letting a number of radio beams rotate or sweep through (sections of) a circle. This process may comprise transmission of downlink radio beams into certain directions carrying a beacon followed by reception of uplink radio signals from the UEs residing in those directions. It may be either a provident process or take place upon request of the infrastructure side.

Alternatively, UEs that receive the relay node's downlink beacon transmission(s) with good enough signal strength report this event as part of their normal RRM measurements to the infrastructure side via their serving base stations.

If information about UE population/density is available at the relay node, the relay node may include this information in its transmission to the infrastructure node of higher hierarchy. In detail, it may indicate to the infrastructure node spots of dense or sparse UE population as well as measured or estimated directions and distances (e.g., how many UEs are present in what direction at what distance?) to help identify potential UEs that need to be served by the relay node.

Figure 6:
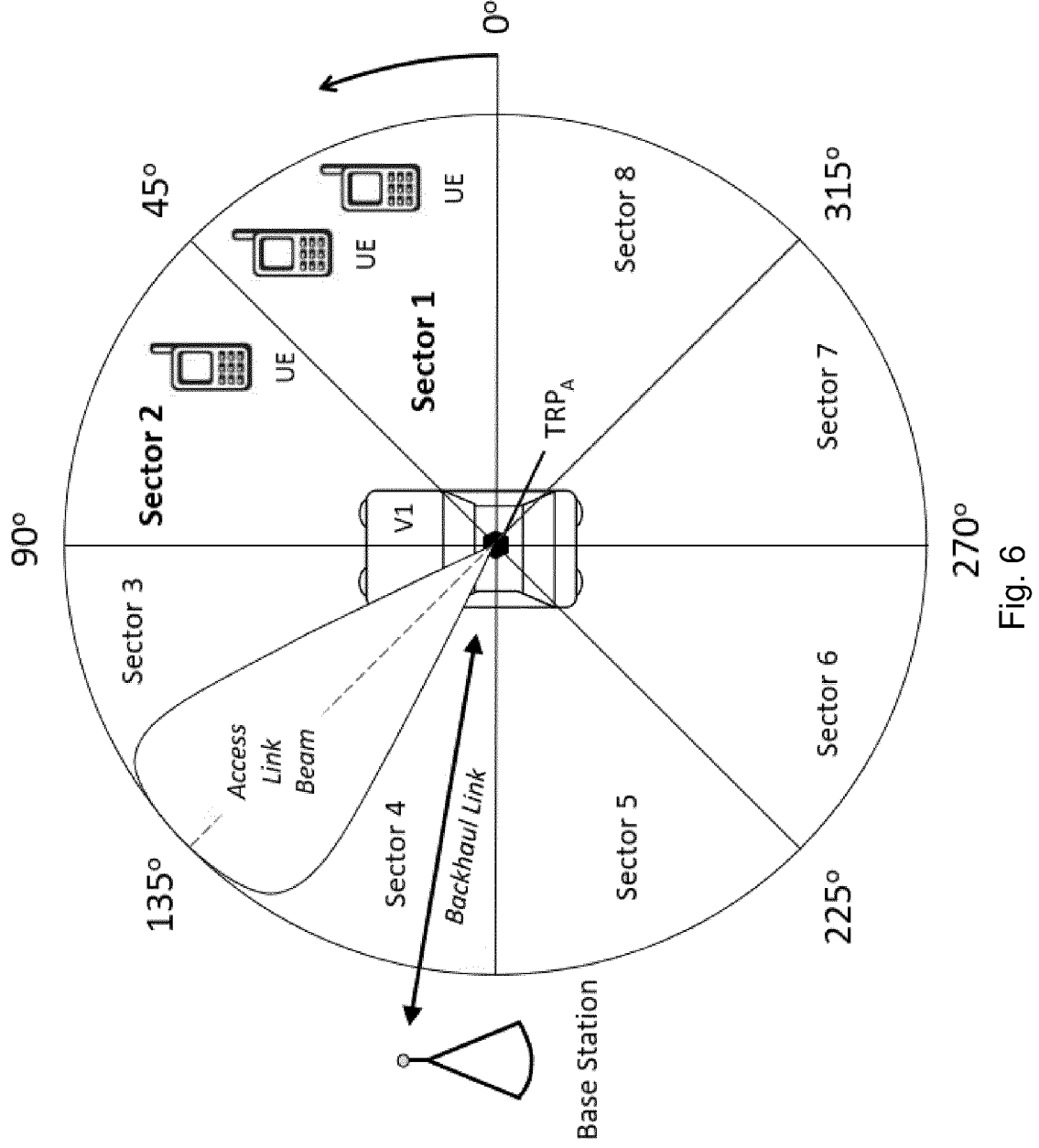
FIG. 6 illustrates a detection of dense and sparse UE populations within radio range of a mobile relay node.

FIG. 6 shows how information about the UE population in vicinity of a mobile relay node can be gathered. First, a coordinate system (ideally a polar coordinate system) needs to be established with TRP$_A$ as the "pole" (or reference point) located in the centre. Then, at least one radio beam is transmitted from TRP$_A$ carrying at least one downlink beacon. It is advantageous to let a number of radio beams rotate or sweep through (sections of) a circle. In the example of FIG. 6 eight sectors are defined. The amount of sector may depend on the scenario and there may be more (finer granularity) or less (coarser granularity) than eight sectors, as needed. A UE device receiving the downlink beacon with good enough signal strength is residing within reach of the mobile relay node and has two options how to respond: It may either directly answer the downlink beacon by transmitting an uplink radio signals back to the mobile relay node in question, or it may inform the infrastructure side about the reception of the relay node's downlink beacon as part of the regular RRM measurements reporting procedure (i.e. it gives feedback indirectly via its serving base station). For the former, the relay node can calculate the density of potential communication peers per direction, for the latter the infrastructure side can do the calculation.

If the UE devices have different capabilities regarding this feature, a first group of UE devices may answer directly, and a second group of UE devices may answer indirectly. In this case, one of the infrastructure nodes of higher hierarchy would have to collect and combine the feedback received from the various UE devices via the two different paths.

The use of different beacon identifiers (e.g., a different one for each sector) is advantageous. If the range of the radio beams carrying the different beacons is varied in addition (e.g., by controlling transmit power and/or beam forming of the TRP$_A$ appropriately), the distance of the UE population from the mobile relay node may also be estimated. Again, the use of different beacon identifiers (e.g., a different one for each range) is advantageous. Either way, the infrastructure node of higher hierarchy can be informed about spots of dense or sparse UE population as well as measured or estimated directions and distances (how many UEs are present in what direction at what distance?) to help identify potential UEs that need to be served by the relay node.

The example vehicle V1 in FIG. 6 has searched for UEs it could potentially serve in eight sectors of a circle and found a dense UE population in sector 1 (here: represented by two UE devices) and a sparse UE population in sector 2 (here: represented by one UE device). The remaining sectors 3 through 8 do not have any UE population of significance in this example.

Table 1 below is an example of a relay node configuration request message. As Table 1 shows, the UE population represented by one UE symbol in FIG. 6 may actually be higher than just one UE device. In the present example, one UE symbol may stand for (in the order of magnitude of) 15 UE devices, two UE symbols may stand for (in the order of magnitude of) 30 UE devices, and so on.

The message to be sent from the mobile relay node to the infrastructure node of higher hierarchy may be termed "relay node configuration request" and may for instance have the structure of Table 1 (according to the first aspect of the present invention).

TABLE 1

| Information Element | Description | Presence |
|---|---|---|
| | Relay Node Location Container | |
| Longitude | Indicating the geolocation (longitude portion) of the relay node/TRP$_A$/vehicle, e.g. 10° 31' 8" E | Mandatory |

TABLE 1-continued

| Information Element | Description | Presence |
|---|---|---|
| Latitude | Indicating the geolocation (latitude portion) of the relay node/TRP$_A$/vehicle, e.g. 52° 15' 20.5" N | Mandatory |
| Height | Indicating the geolocation (height above sea level portion) of the relay node/TRP$_A$/vehicle, e.g. 74 m | Optional |
| | UE Population Container | |
| Sector Width | Indicating the granularity of the sectors during the search procedure, e.g. 15° (twenty-four sectors); 30° (twelve sectors); 45° (eight sectors); 60° (six sectors); 120° (three sectors); 180° (two sectors). | Mandatory |
| Starting Point (for the above) | Any direction in the range from 0° to 360°. The default setting is 0° (East, cf. FIG. 6). | Mandatory |
| Sector Numbering | Sector numbering can be performed in clockwise or counter-clockwise direction. Clockwise; Counter-clockwise. Counter-clockwise is the default, if this field is not present. | Optional |
| Sector Information | Indicates sector numbers with high UE population (e.g., in form of a ranking in descending order): Sector 1; Sector 2; Sector 5; Sector 3; etc. Alternatively, it indicates the UE density per sector, e.g.: Sector 1: 30 UE devices to serve; Sector 2: 15 UE devices to serve; Sector 5: 3 UE devices to serve; Sector 3: 2 UE devices to serve; etc. | Mandatory |
| | Vehicle Status Container | |
| State Indication | If the relay node is mounted to a vehicle, specifying the status of the vehicle, e.g. Driving; Shunting; Stopping (short term, due to traffic conditions); Parking (long term); etc. | Optional |
| Power Supply | List of power supply options, e.g. Solar panel Battery Fuel cell | Optional |
| Power Level | Indicating the battery's current power level. | Optional |
| Remaining Run Time | The Relay Node's estimated remaining run time. | Optional |
| Vehicle Orientation | Indicating the vehicle's orientation at the reported location, for example: Northbound; Eastbound; Southbound; Westbound. | Optional |
| Duration of Stay | Indicating the vehicle's projected duration of stay at the reported location, for example: until 5:10pm; until 24 Aug. 2020; for the next two hours; all weekend; etc. This may be a relative or absolute point in time | Optional |
| | Antenna Orientation | |
| Beam Forming Support | Indicating whether TRP$_A$ supports beam forming operations, for example: true; false. | Mandatory |

TABLE 1-continued

| Information Element | Description | Presence |
|---|---|---|
| Number of Concurrent Beams | Indicating how many concurrent radio beams $TRP_A$ supports, for example: 1; 2; etc. | Mandatory |
| Main Lobe Angle Range | Indicating over which range $TRP_A$ supports beam rotation, e.g.: from 0 to 360°; from 30° to 90°; etc. | Mandatory |
| Starting Point (for the above) | Any direction in the range from 0° to 360°. The default setting is 0° (East, cf. FIG. 6). | Mandatory |
| Current Main Lobe Direction | Indicating the current beam orientation, e.g.: 135° (cf. Access Link Beam in FIG. 6); etc. | Mandatory |
| . . . | . . . | . . . |

Figure 4:
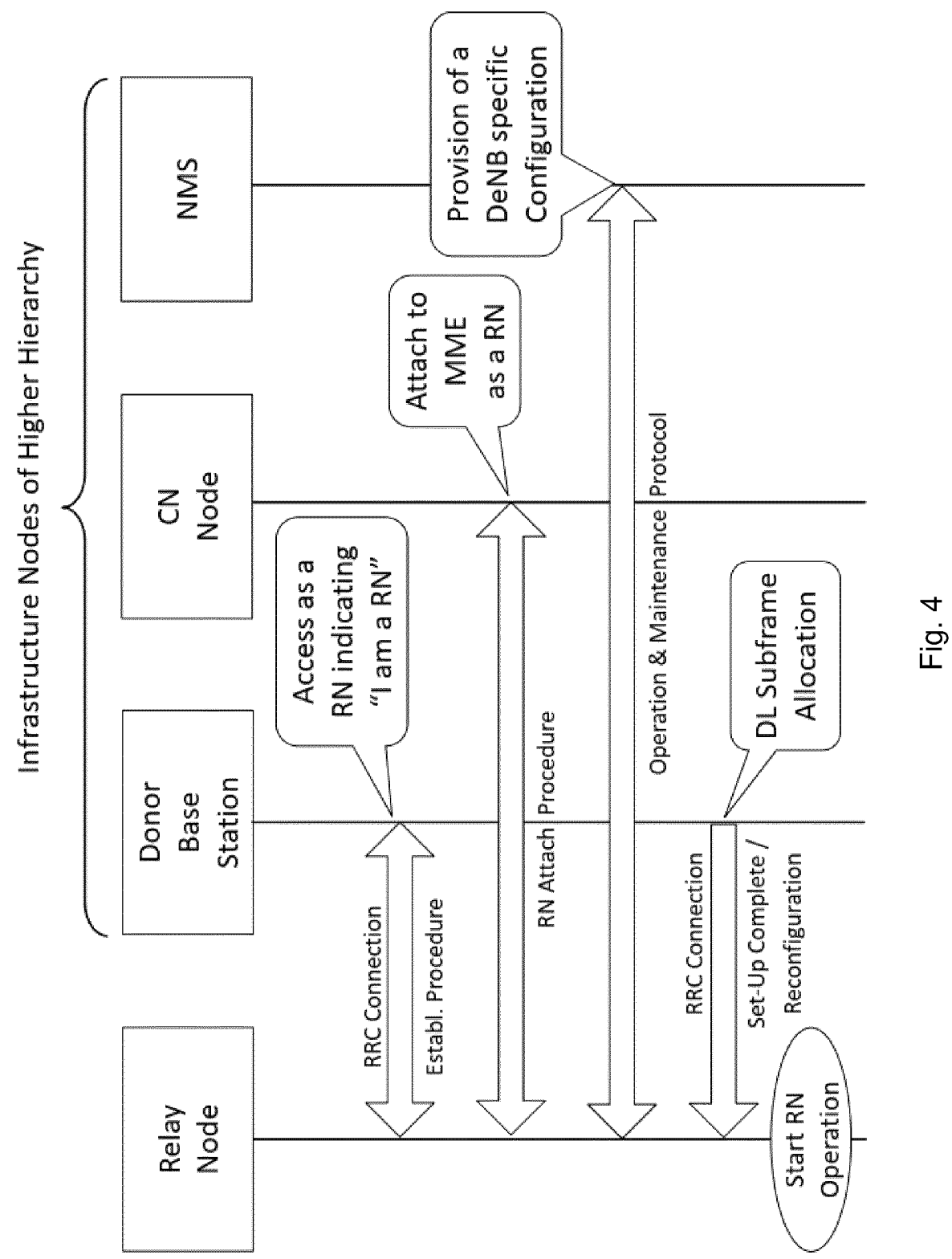
FIG. 4 is a message flow chart of a second step for establishing a relay node operation.

In a scenario based on the two-step RN start-up procedure for 3GPP 4G-LTE Rel-10 relays, the "relay node configuration request" message would be part of the second step, in which the relay node attaches for RN operation thereby indicating "I am a RN." (cf. FIG. 4). In a scenario based on 3GPP 5G-NR Rel-16 IAB Nodes the "relay node configuration request" message would be an enhancement of the inter-IAB-node message exchange.

If the infrastructure side is tasked to calculate the density of potential communication peers at a given location (i.e. if the UE devices are answering—at least in part—indirectly via their own serving base stations), then it may be beneficial to let the mobile relay node indicate to the infrastructure node of higher hierarchy details about the beacon identifiers (e.g., different ones for each sector) it has used within its service area. This would facilitate the mapping of beacon identifiers used by the relay node to those potentially reported by UE devices in vicinity of the mobile relay node.

For this, the following (block of) information elements can be (optionally) included in the example message structure depicted in Table 1.

| Information Element | Description | Presence |
|---|---|---|
| | Beacon Container | |
| Beacon List | List of beacon identifiers used. | Optional |

The corresponding reply message to be sent from the infrastructure node of higher hierarchy to the mobile relay node may be termed "relay node configuration response". An example message structure for this message is given in Table 2 (according to the fourth aspect of the present invention). It is carrying location and/or direction specific configuration details for the relay node to apply for adjustment of its service area.

TABLE 2

| Information Element | Description | Presence |
|---|---|---|
| Antenna Characteristic | Indication whether the relay node shall apply an omni-directional antenna characteristic for signal transmission and reception, or beam forming towards a certain spot or into a certain direction, e.g.: omni; | Mandatory |

TABLE 2-continued

| Information Element | Description | Presence |
|---|---|---|
| | beam. | |
| Number of Beams | Indicating the number of beams that are configured with this message. | Mandatory |
| | Beam Container (one per Beam) | |
| Beam-ID | Identifier of the beam whose properties are defined in this container. If a Beam-ID of a beam is present that has been configured previously, then the respective container means a re-configuration for said beam. Example: ABC123 . . . | Mandatory |
| Sector Number | Indicating the sector number this beam should provide coverage for, e.g.: Sector 1. (cf. adjusted Access Link Beam in FIG. 7). | Optional |
| Beam Width | Indicating the (adjusted) width of the beam, e.g. 5°; 10°; 15°; etc. | Optional |
| Beam Tilt | Indicating the (adjusted) tilt of the beam, e.g. −2°; −1°; 0°; +1°; +2°. | Optional |
| Main Lobe Direction | Indicating the (adjusted) beam orientation, e.g.: 22.5° (cf. "Access Link Beam" in FIG. 7). | Optional |
| Beam Range | Indicating the (adjusted) range of the beam, e.g. 10 m; 15 m; 20 m; etc. | Optional |
| Beam Tx Power | Indicating the (adjusted) Tx Power of the beam, e.g. +2 dBm; +3 dBm; +4 dBm; etc. Alternatively, a Power Level (PL) or Power Class (PC) can be indicated, e.g.: PL1/PC1; PL2/PC2; etc. | Optional |

TABLE 2-continued

| Information Element | Description | Presence |
|---|---|---|
| Validity | Indicating the validity for this set of (re-) configuration parameters, e.g.<br>until 6:20pm;<br>until 25 Aug. 2020;<br>for the next three hours;<br>all weekend;<br>etc.<br>This may be a relative or absolute point in time. | Optional |
| Carrier Frequency System Bandwidth Bandwidth Parts | Further auxiliary configuration parameters, such as the ones shown on the left, may be present as well. | Optional |
| . | . | . |
| . | . | . |
| . | . | . |

In a scenario based on the two-step RN start-up procedure for 3GPP 4G-LTE Rel-10 relays, the "relay node configuration response" message would be part of the second step. Likewise, in a scenario based on 3GPP 5G-NR Rel-16 IAB Nodes the "relay node configuration response" message would be an enhancement of the inter-IAB-node message exchange.

The group of information elements "Beam Width", "Beam Tilt", "Main Lobe Direction", "Beam Range" and "Beam Tx Power" can (either in part or in conjunction) be used as an alternative to the information element "Sector Number". With this, it is either possible for an infrastructure node (of higher hierarchy) to refer to a sector number as defined by the mobile relay node in the preceding "relay node configuration request" message, or to use (a group of) geometrical configuration parameters instead.

Figure 7:
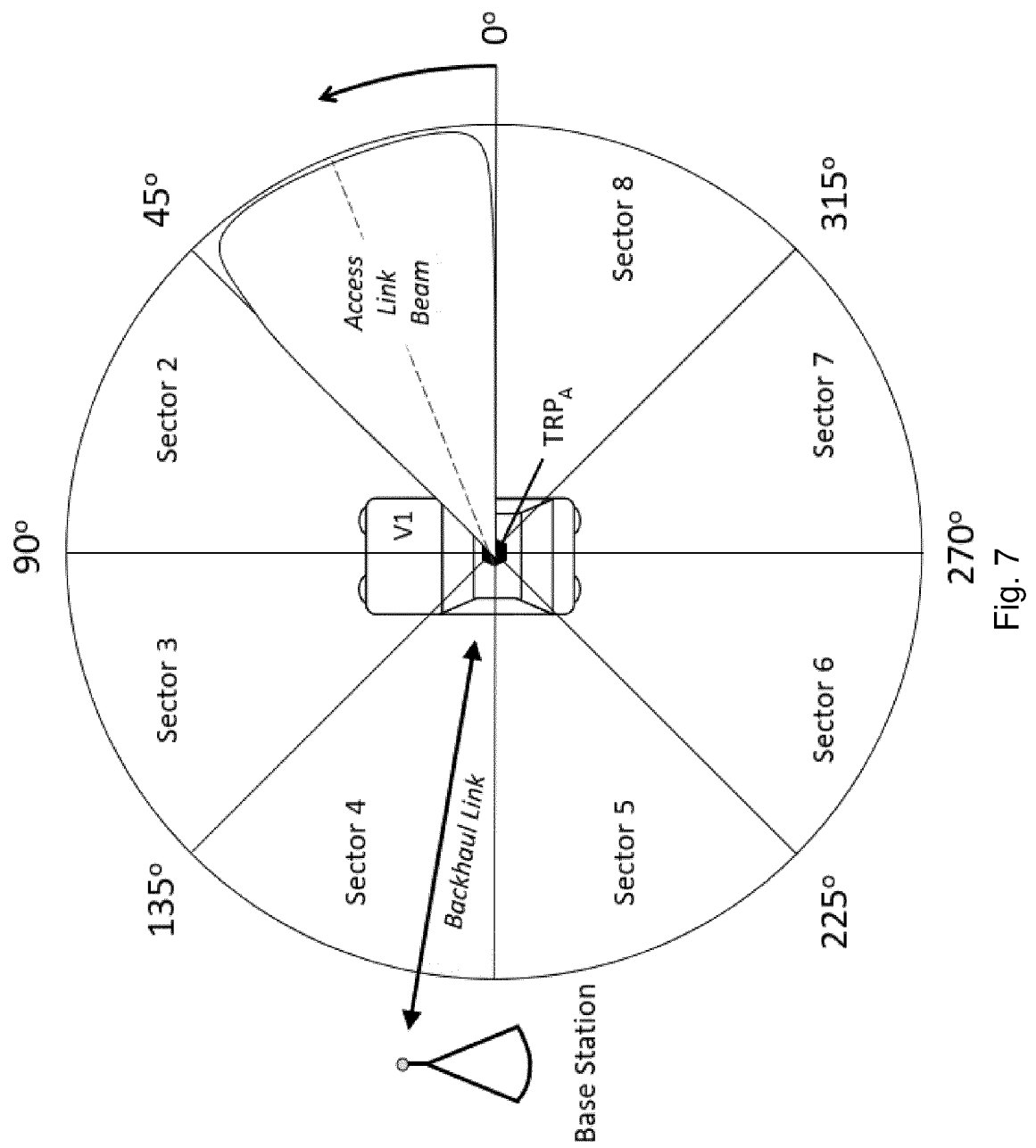
FIG. 7 illustrates a mobile relay node configured to serve a dense population of UEs using a steered beam.

FIG. 7 shows the coverage area of FIG. 6 after the "relay node configuration response" message of Table 2 has been received by the mobile relay node and the configuration details have been applied (according to the fifth aspect of the present invention). In this example, $TRP_A$ has been instructed to provide coverage in sector 1 (i.e. the sector with the largest UE population). Consequently, $TRP_A$ directs one or more Access Link Beams to UE devices residing in sector 1.

As mentioned above, providing an access link beam may comprise (from $TRP_A$ point of view) directing radio signal transmission capabilities into a given direction (for Tx Beam); directing radio signal reception capabilities into a given direction (for Rx Beam); or directing both capabilities into the same direction.

Evaluating the information received from the relay node (e.g., in form of a "relay node configuration request" message) by an infrastructure node of a higher hierarchy is the second aspect of the present invention. Sometimes, one infrastructure node may need to forward the request to another infrastructure node (again, of higher hierarchy), so that an evaluation may be performed there. The infrastructure node may forward the request to another infrastructure node (again, of higher hierarchy) or to a network management system (MNS) or an operation and maintenance (O&A) server.

In this context, evaluating may comprise processing the information received from the mobile relay node, for example information elements relating to the relay node's location, the UE population in its vicinity (as detected by the relay node), the vehicle's status (if the mobile relay node is mounted to a vehicle), the orientation options of the relay node's antenna system, the vehicle's orientation (if the mobile relay node is mounted to a vehicle), and so on; deciding on configuration parameters to be signalled back to the relay node—based on the evaluation mentioned above—in order to enable an efficient operation of the relay node at the indicated location; and composing a configuration message with at least one set of information elements for configuring the mobile relay node with location and/or direction dependent parameters for transmission and reception of radio signals at its current location. A validity time for each set of configuration parameters may also be included (cf. Table 2).

Figures 1, 2:
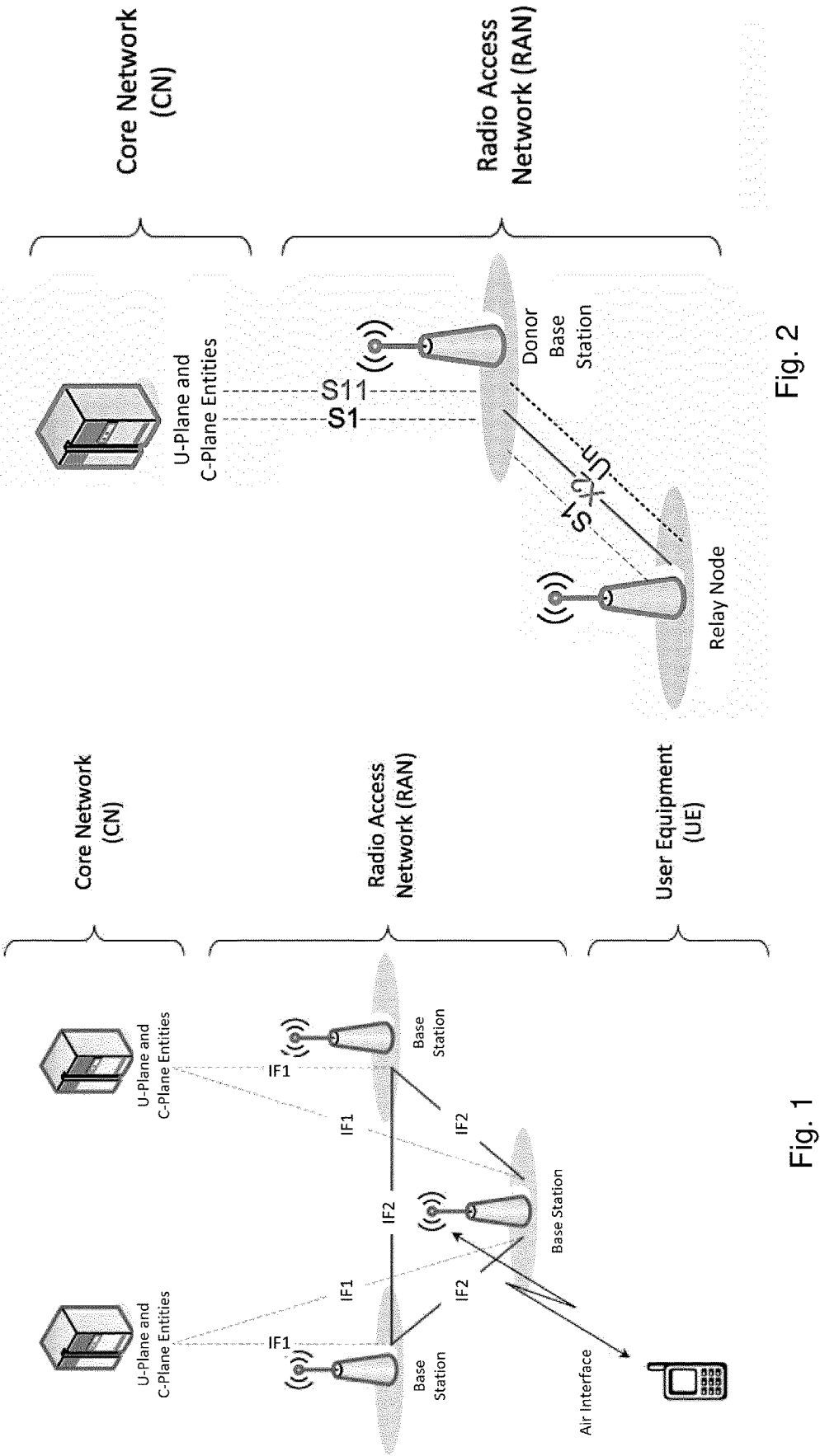
FIG. 1 shows a schematic exemplary cellular communication system according to 3GPP.
FIG. 2 shows a schematic exemplary 4G LTE cellular communication system with a donor station (infrastructure node) serving a relay node.
Figure 3:
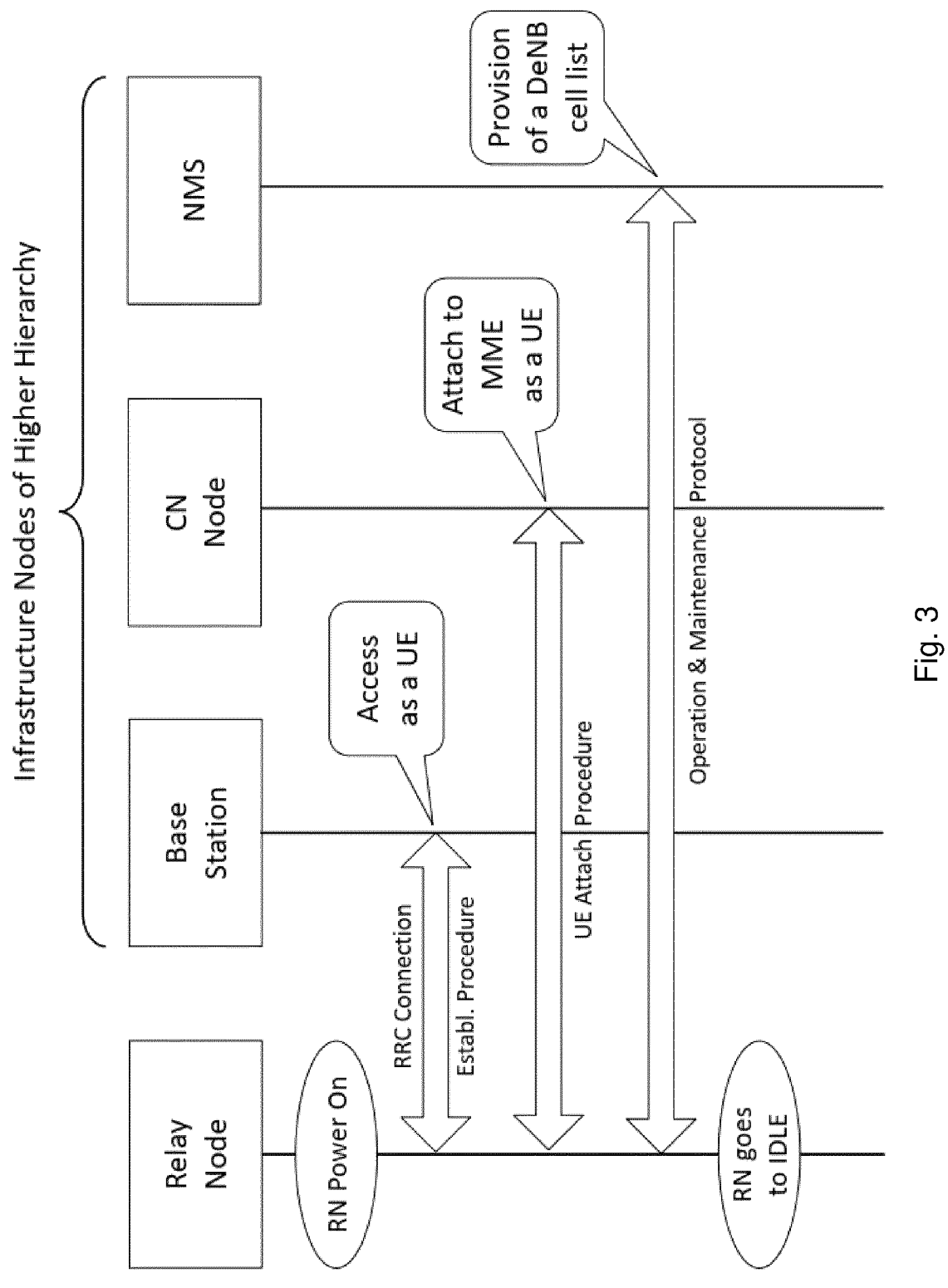
FIG. 3 is a message flow chart of a first step for establishing a relay node operation.

As one can see from FIGS. 3 and 4, there are multiple network entities (i.e. infrastructure nodes of a higher hierarchy) that can contribute to the configuration of a mobile relay node: Some or all configuration parameters needed to configure the mobile relay node for location and/or direction dependent transmission and reception of radio signals according to the teachings of this invention can be provided, for example, by a parent RAN Node, such as a donor base station; a respective control node in the CN, such as an MME (in case of 4G-LTE) or an AMF (in case of 5G-NR); a network management server (providing Operation and Maintenance functionality).

Some or all of these nodes may have access to a database (not shown in FIGS. 3 and 4 for sake of simplicity, but shown in FIG. 8) from which, inter alia, location specific and/or historic information pertaining to relay node operation can be retrieved to help in the decision-making process.

Thus, the various information elements of the request and response messages of Tables 1 and 2 need to be exchanged either in parts or in their entirety between the entities involved. This may take place on different protocol layers of the wireless communication system, as will be explained hereinafter.

For example, when the relay node wants to request a configuration (or a configuration update) from its serving base station located in the RAN (which is one type of infrastructure node of a higher hierarchy), instantiations of the messages can be exchanged by means of the radio resource control (RRC) protocol. Consequently, in one embodiment of the present invention the "relay node configuration request" message and the "relay node configuration response" message would be realized as RRC Messages.

For example, when the relay node wants to request a configuration (or a configuration update) from an IAB node in the RAN (which may in some scenarios also be an infrastructure node of a higher hierarchy), instantiations of the messages can be exchanged by means of an IAB specific protocol. Consequently, in one embodiment of the present invention the "relay node configuration request" message and the "relay node configuration response" message would be realized as IAB messages.

For example, when an infrastructure node of the RAN (such as a donor base station or a parent IAB node) wants to forward the request message to a core network entity (or the response message back to the relay node), instantiations of the messages can be exchanged by means of an S1 specific protocol (in case of 4G-LTE) or an NG specific protocol (in case of 5G-NR). Consequently, in one embodiment of the present invention the "relay node configuration request" message and the "relay node configuration response" message would be realized as S1AP or NGAP messages.

For example, when the relay node wants to request a configuration (or a configuration update) from its associated control plane entity residing in the CN (which is as well an infrastructure node of a higher hierarchy), instantiations of the messages can be exchanged by means of the non-access stratum (NAS) protocol. Consequently, in another embodiment of the present invention the "relay node configuration request" message and the "relay node configuration response" message would be realized as NAS messages.

For example, when the relay node wants to request a configuration (or a configuration update) from a network management server (which is another type of infrastructure node of a higher hierarchy), instantiations of the messages can be exchanged by means of an operation and maintenance (O&M) protocol. Consequently, in another embodiment of the present invention the "relay node configuration request" message and the "relay node configuration response" message would be realized as O&M messages.

As mentioned above, there may be more than one access link beam if $TRP_A$ supports multiple concurrent directional radio transmissions/receptions.

In one embodiment, a single set of direction specific configuration parameters may correspond to one transmission orientation of a downlink radio beam (to be) transmitted by $TRP_A$ or one reception orientation of an uplink radio beam (to be) received by $TRP_A$ or both.

In a further embodiment, configuring a mobile relay node with location and/or direction dependent parameters to control the transmission and reception of radio signals according to the teachings of this invention may be based on database interrogations (cf. fourth aspect of the present invention). An example message sequence comprising a query message and a response message for this aspect of the invention is given in FIG. 8.

An infrastructure node of higher hierarchy can be (inter alia) a donor base station, an IAB node, a core network entity, a network management system (MNS) or an operation and maintenance (O&A) server.

For example, the query message in FIG. 8 may contain various pieces of location information, for example the geographical position of the mobile relay node to be configured or reconfigured for operation. The database may store various pieces of information that may be considered (or, are required) in the decision-making process and when the "relay node configuration response" message is compiled, respectively. In detail, the amount of data stored in the database may comprise at least one piece of information from the following list of information (some of which may be location and/or direction specific):

Information about allowed (preferred) and/or forbidden (deprecated) sets of parameters for relay node operation (for instance, at a given geographical position), such as frequency bands, carrier frequencies, system bandwidth, bandwidth parts, maximum transmission power, Tx beam orientations, Rx beam orientations, etc.

Historic information about the provisioning of former relay nodes with configuration data that were residing at the same (or roughly the same) location, such as The efficiency of relay node operation with said configurations data;

The usefulness of configured parameters for relay node operation;

The impracticality of configured parameters for relay node operation.

An efficiency level (or score) can be calculated for this.

Relay node behaviour in similar situations and/or under similar circumstances, such as Outcome of configuration or reconfiguration attempts.

Shadowing effects experienced by former relay nodes.

Signal attenuation effects experienced by former relay nodes.

Furthermore, the database may comprise also at least one piece of information from the following list of location and/or direction specific information:

Topography

Relief/Elevation

Landscape

Maps, Traffic Routes, Buildings, Plants, Houses, Vegetation, etc.

Statistical UE Density and/or UE Movement (e.g., over time, difference between office hours and night-time, difference between weekdays and weekend, and so on.)

Places of interest.

In another embodiment of a database interrogation, the list of input parameters conveyed with the "database query" message of FIG. 8 comprises at least the location details of the mobile relay node to be configures and estimations regarding UE population in its vicinity (potentially including sector identifiers). And the list of output parameters conveyed with the "database response" message of FIG. 8 comprises at least configuration data describing one or more area(s) to be served (e.g., by means of angle, distance, beam width, sector identifier), maximum transmit power, bandwidth parts configuration, measurement gap configuration, a decision whether to use omni-directional or beam-formed signal transmission/reception, allowed (preferred) and/or forbidden (deprecated) beam orientations, and so on.

In general, when relay node configuration decisions are made or when the "relay node configuration response" messages are compiled, optionally other pieces of information can be figured in, such as knowledge about the area of interest, street map, landscape, topology and/or the vehicle's or relay node's past and projected itineraries and/or the vehicle's projected duration of stay and/or historic information about successful/unsuccessful relay node configuration gathered from other relay nodes that were present at the same location earlier or under similar circumstances.

It is another aspect (Aspect 6) of the present invention to fill (or, update) the database with meaningful data that may be needed to assist in future relay node configuration operations as shown in FIG. 9. Similar to the explanations in respect of FIG. 8, an infrastructure node of higher hierarchy can be (inter alia) a donor base station, an IAB node, a core network entity, a network management system (MNS) or an operation and maintenance (O&A) server.

For example, an infrastructure node of higher hierarchy can update the database by means of a "database update" message shown in FIG. 9. It may contain historic relay node configuration information, details about a relay node's experience/behaviour in similar situations at similar locations, and statistical information regarding UE density and UE movement at points of interest.

TABLE 3

| Area-ID | Location Description | Parameters |
|---|---|---|
| A | Coastal highway running in north/south direction with parking lane on one side. The beach is located west of the highway, some office buildings are located east of the highway. | Beach to the west: number of UEs is high on fair weather days and low on bad weather days. Office buildings to the east: number of UEs is high during office hours and low over the weekend. |

TABLE 3-continued

| Area-ID | Location Description | Parameters |
|---|---|---|
| B | A parking lot located between a baseball stadium to the north of it and a shopping mall to the south of it. | Stadium to the north: number of UEs is high on game days during baseball season. Shopping mall to the south: number of UEs is high during opening hours of the shops. |
| . | . | . |
| . | . | . |
| . | . | . |

Two exemplary data records for two example locations (Location A is representing a coastal highway and location B is representing a parking lot located between a stadium and a shopping mall) are given in Table 3. Here, we assume that the geolocations reported by a mobile relay node (e.g., by means of GNSS coordinates or in any other suitable format) are mapped to Area-IDs (such as Locations A and B). Depending on the scenario, this allows variation of the location granularity, i.e. in homogeneous regions the area of interest defined by an Area-ID may be quite large (e.g., up to a few square kilometres), while in heterogeneous regions the area of interest defined by an Area-ID can be restricted to a few hectares (which is a non-SI metric unit of area equal to a square with 100-metre sides). In addition to the proposed mapping to Area-IDs, other correlation methods between reported geolocations and data base entries are possible as well.

For better understanding, Table 3 contains human-readable text. It is noteworthy to mention that in real-life deployments, the data may be encoded in a computer readable format, for example in extensible markup language (XML), or using a hexadecimal or binary code.

According to a seventh aspect of the present invention, events are discussed for initiating the procedures of the invention. For example, the "relay node configuration request" message can be polled from infrastructure side (either periodically or on a per-need basis) or transmitted when a predefined or preconfigured event is detected in the relay node or by the vehicle the mobile relay node is deployed in. Such a predefined or preconfigured event may for instance be at least one of the following events:

The vehicle stops (short term);
The vehicle is parked (long term);
The vehicle's systems are powered up or down;
The vehicle's engines are turned on or off;
Parking time negotiations (or, more generally, booking of parking space) with a parking meter or some parking space management server on the internet or a similar function deployed in a roadside unit are completed (either successfully or unsuccessfully);
Switch from manual driving to autonomous driving;
Switch from autonomous driving to manual driving;
Geofencing:
The vehicle approaches or leaves a point of interest;
The vehicle approaches or leaves an area of interest;
A timer is set/running out;
etc.

In general, predefined or preconfigured events, as given for instance in the list above, may be vehicle specific or applicable for a group of vehicles.

The invention claimed is:

1. A method for configuring a mobile relay node in a communications system, the method comprising:

sending, by the mobile relay node to an infrastructure node of the communications system, a request message that comprises information that indicates a geolocation of the mobile relay node and requests location dependent configuration data which are i) dependent on the geolocation of the mobile relay node and ii) for controlling a communication of the mobile relay node with one or more user equipment devices, wherein the geolocation of the mobile relay node is indicated by a longitude portion and a latitude portion of the geolocation of the mobile relay node;

providing, by the mobile relay node to the infrastructure node, data that indicates a distribution of user equipment within a radio range of the mobile relay node, wherein:

the user equipment are distributed in more than one sector within the radio range of the mobile relay node, and the data includes a sector width indicating a granularity of the more than one sector, a starting point of the more than one sector, and sector information indicating index numbers of the more than one sector in order of population of the user equipment from highest to lowest;

receiving, from the infrastructure node and based at least in part on the request message and the data, the location dependent configuration data; and configuring radio transmission characteristics of the mobile relay node based at least in part on the received location dependent configuration data.

2. The method of claim 1, wherein the location dependent configuration data includes information relating to a direction in which the mobile relay node should transmit radio signals and wherein the information includes beam information associated with one or more beams corresponding to the direction in which the mobile relay node should transmit radio signals and sector information indicating a particular sector number that the respective beam provides coverage.

3. The method of claim 1, wherein the request message comprises at least one of a current location of the mobile relay node, a direction of movement of the mobile relay node, or a predicted duration of the mobile relay node maintaining the current location.

4. The method of claim 1, comprising providing, by the mobile relay node to the infrastructure node, information about a power supply of the mobile relay node for use in determining the location dependent configuration data.

5. The method of claim 1, wherein configuring the radio transmission characteristics comprises configuring at least one of the mobile relay node's service area, the mobile relay node's maximum transmit power, the mobile relay node's bandwidth parts configuration, or the mobile relay node's measurement gap configuration.

6. The method of claim 1, wherein configuring the radio transmission characteristics comprises configuring at least one of the mobile relay node's service area based at least in part on one of a beam angle, a beam distance, a beam width, or a beam tilt.

7. The method of claim 1, comprising detecting an event for the mobile relay node, wherein sending the request message is responsive to detecting the event for the mobile relay node.

8. The method of claim 7, wherein the event comprises at least one of movement of the mobile relay node, stopping of the mobile relay node, a change in a configuration property of the mobile relay node, or detection of the mobile relay node satisfying a geofence threshold.

9. A method of operating an infrastructure node of a mobile communications system, the method comprising:
receiving, at the infrastructure node of the mobile communications system from a mobile relay node, a request message that comprises information that indicates a geolocation of the mobile relay node and requests location dependent configuration data which are i) dependent on the geolocation of the mobile relay node and ii) for controlling a communication of the mobile relay node with one or more user equipment devices, wherein the geolocation of the mobile relay node is indicated by a longitude portion and a latitude portion of the geolocation of the mobile relay node;
receiving data that indicates a distribution of user equipment within a radio range of the mobile relay node, wherein:
the user equipment are distributed in more than one sector within the radio range of the mobile relay node, and
the data includes a sector width indicating a granularity of the more than one sector, a starting point of the more than one sector, and sector information indicating index numbers of the more than one sector in order of population of the user equipment from highest to lowest;
generating, based at least in part on the received information that indicates the geolocation of the mobile relay node and the data, the requested location dependent configuration data for use by the mobile relay node for configuring radio transmission characteristics for transmitting signals to one or more user equipment devices; and
transmitting the requested location dependent configuration data to the mobile relay node.

10. The method of claim 9, wherein generating the requested location dependent configuration data is based at least on one of a current location of the mobile relay node, a direction of movement of the mobile relay node, or a predicted duration of the mobile relay node maintaining the current location.

11. The method of claim 10, wherein generating the requested location dependent configuration data comprises selecting, from a plurality of configuration parameters, one or more configuration parameters to be transmitted to the mobile relay node.

12. The method of claim 9, comprising accessing data in a database of stored information based at least in part on the received information that indicates the geolocation of the mobile relay node, wherein generating the location dependent configuration data is based at least in part on the accessed data.

13. The method of claim 9, wherein the location dependent configuration data contain instructions for the mobile relay node to transmit signals in a particular direction and wherein the location dependent configuration data includes beam information associated with one or more beams corresponding to the direction in which the mobile relay node should transmit radio signals and sector information indicating a particular sector number that the respective beam provides coverage.

14. The method of claim 12, wherein:
the data in the database comprises historical information about prior provisioning of former relay nodes; and
accessing the data comprises accessing the data for other nodes that were at or approximately at the geolocation of the mobile relay node.

15. The method of claim 9, wherein the location dependent configuration data contain instructions for at least one of the mobile relay node's service area, the mobile relay node's maximum transmit power, the mobile relay node's bandwidth parts configuration, or the mobile relay node's measurement gap configuration.

16. An apparatus comprising one or more processors configured to perform operations comprising:
sending, by a mobile relay node to an infrastructure node of a communications system, a request message that comprises information that indicates a geolocation of the mobile relay node and requests location dependent configuration data which are i) dependent on the geolocation of the mobile relay node and ii) for controlling a communication of the mobile relay node with one or more user equipment devices, wherein the geolocation of the mobile relay node is indicated by a longitude portion and a latitude portion of the geolocation of the mobile relay node;
providing, by the mobile relay node to the infrastructure node, data that indicates a distribution of user equipment within a radio range of the mobile relay node, wherein:
the user equipment are distributed in more than one sector within the radio range of the mobile relay node, and
the data includes a sector width indicating a granularity of the more than one sector, a starting point of the more than one sector, and sector information indicating index numbers of the more than one sector in order of population of the user equipment from highest to lowest;
receiving, from the infrastructure node and based at least in part on the request message, the location dependent configuration data; and
configuring radio transmission characteristics of the mobile relay node based at least in part on the received location dependent configuration data.

17. The apparatus of claim 16, wherein the location dependent configuration data includes information relating to a direction in which the mobile relay node should transmit radio signals and wherein the information includes beam information associated with one or more beams corresponding to the direction in which the mobile relay node should transmit radio signals and sector information indicating a particular sector number that the respective beam provides coverage.

18. The apparatus of claim 16, wherein the request message comprises at least one of a current location of the mobile relay node, a direction of movement of the mobile relay node, or a predicted duration of the mobile relay node maintaining the current location.

* * * * *